United States Patent [19]

Watanabe et al.

[11] Patent Number: 5,617,170
[45] Date of Patent: Apr. 1, 1997

[54] CAMERA

[75] Inventors: Takeshi Watanabe; Tsutomu Tanaka, both of Tokyo, Japan

[73] Assignee: Fuji Photo Film Co., Ltd., Kanagawa, Japan

[21] Appl. No.: 510,308

[22] Filed: Aug. 2, 1995

[30] Foreign Application Priority Data

Aug. 2, 1994 [JP] Japan .................. 6-180998

[51] Int. Cl.$^6$ .................. G03B 13/10; G03B 17/24
[52] U.S. Cl. .................. 396/378
[58] Field of Search .................. 354/105, 106, 354/221, 222

[56] References Cited

U.S. PATENT DOCUMENTS

| | | | |
|---|---|---|---|
| 5,028,942 | 7/1991 | Kirigaya | 354/106 |
| 5,227,824 | 7/1993 | Yoshida et al. | 354/195.12 |
| 5,266,989 | 11/1993 | Okano et al. | 354/106 |
| 5,270,755 | 12/1993 | Ohno et al. | 354/106 |
| 5,319,403 | 6/1994 | Sakamoto et al. | 354/106 |
| 5,386,259 | 1/1995 | Ichikawa et al. | 354/94 |
| 5,438,381 | 8/1995 | Mogamiya et al. | 354/199 |

FOREIGN PATENT DOCUMENTS

| | | | |
|---|---|---|---|
| 4360136 | 12/1992 | Japan | G03B 17/24 |

*Primary Examiner*—Safet Metjahic
*Assistant Examiner*—John Chizmar
*Attorney, Agent, or Firm*—Sughrue, Mion, Zinn, Macpeak & Seas

[57] ABSTRACT

When a switch is turned on, photographing visual fields among a plurality of photographing visual fields are sequentially changed over at predetermined intervals to be displayed within a finder of a camera. When the switch is turned off, the sequential changeover of the photographing visual fields is stopped. As a result, a plurality of photographing visual fields are automatically displayed so that the photographing visual field corresponding to different aspect ratios and the photographing visual field corresponding to the zooming positions of different taking lenses can be automatically compared separately or in combination.

12 Claims, 9 Drawing Sheets

5,617,170

CAMERA

BACKGROUND OF THE INVENTION

1. Field of the Invention

The present invention relates to a camera and more particularly to a camera which displays photographing visual fields corresponding to information concerning an aspect ratio and a zooming factor.

2. Description of the Related Art

Recently, a film unit with a lens, which is suitable to obtain a photographic print having various aspect ratios has become available commercially. In particular, this film unit with a lens is suitable for prints with film processing, in which a roll of print paper having the same breadth is used. For example, an aspect ratio of a film unit with a so-called panoramic lens is 2.8. Now that the film unit with a panoramic lens is becoming widely used, a camera includes a changeover function for panoramic photographing is available.

However, in the conventional camera, a photographer has to predetermine an aspect ratio of a picture before photographing and carry out necessary operation steps. Further, the most suitable aspect ratio for an object, must be selected from among various aspect ratios. Therefore, he needs to carry out the same operation steps many times in order to try various aspect ratios one by one.

Moreover, in a camera capable of changing focal distances, a picture structure should be known beforehand.

SUMMARY OF THE INVENTION

The present invention has been developed under the above-described circumstances, and has as its aim the provision of a camera by which a photographer can easily select a desired photographing visual field by automatically comparing photographing visual fields of different aspect ratios visually when selecting a screen structure for a subject to be photographed.

The camera of the present invention comprises: a finder capable of displaying a plurality of photographing visual fields; a switch for changing the photographing visual fields; photographing visual field changeover means for sequentially changing each photographing visual field among the plurality of photographing visual fields at predetermined intervals to display each photographing visual field within the finder when the switch is turned on and for stopping a sequential changing of the photographing visual fields when the switch is turned off.

According to the present invention, when the switch for changing the photographing visual fields is turned on, a changing signal is transmitted to the photographing visual field changing means. As a result, the photographing visual field changing means sequentially changes each photographing visual field among a plurality of photographing visual fields at predetermined intervals to display the photographing visual field within the finder. Moreover, the photographing visual field changing means stops the sequential changing of the photographing visual fields when the switch is turned off.

Accordingly, because a plurality of different photographing visual fields can be automatically compared, the photographing visual field corresponding to different aspect ratios and the photographing visual field corresponding to the zooming positions of different taking lenses can be automatically compared.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures and wherein.

DESCRIPTION OF THE PREFERRED EMBODIMENT

Detailed description will hereunder be given of the preferred embodiment of a camera according to the present invention with reference to the accompanying drawings.

Figure 1:
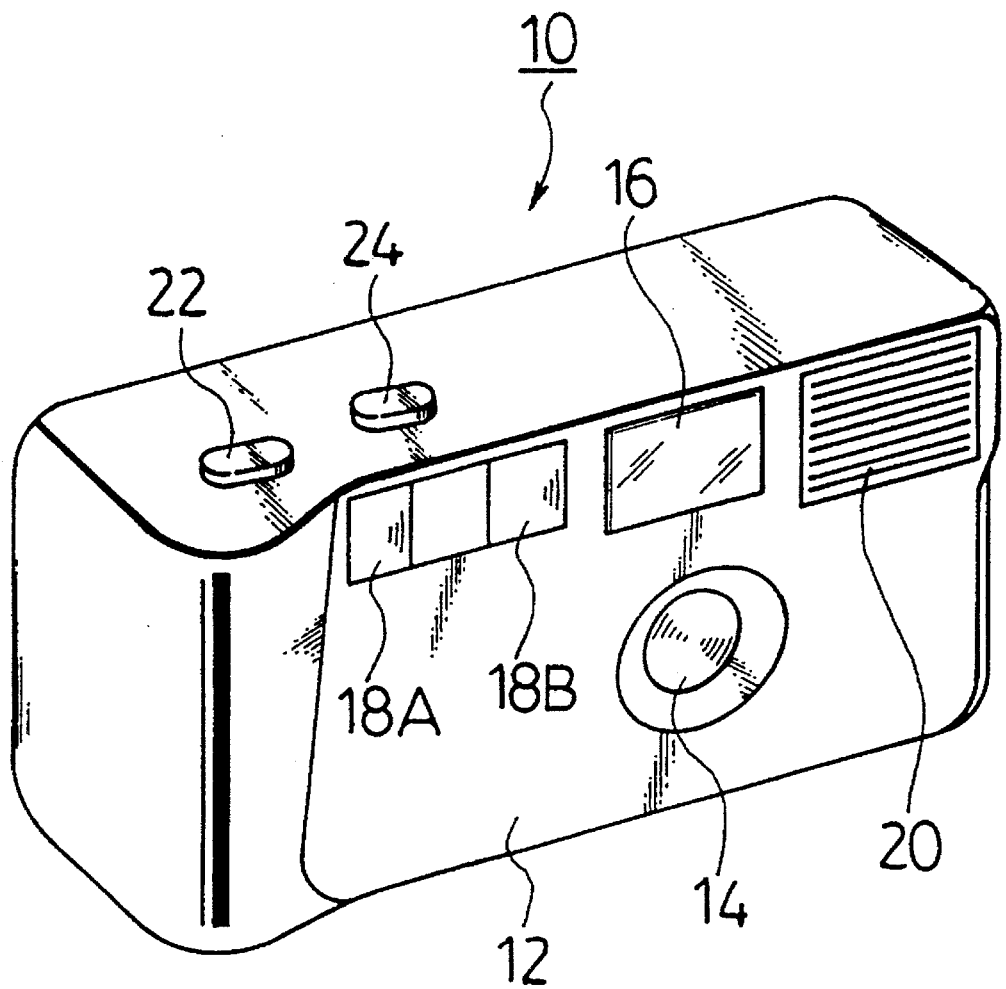
FIG. 1 is an external view of a camera according to the present invention.
Figure 2:
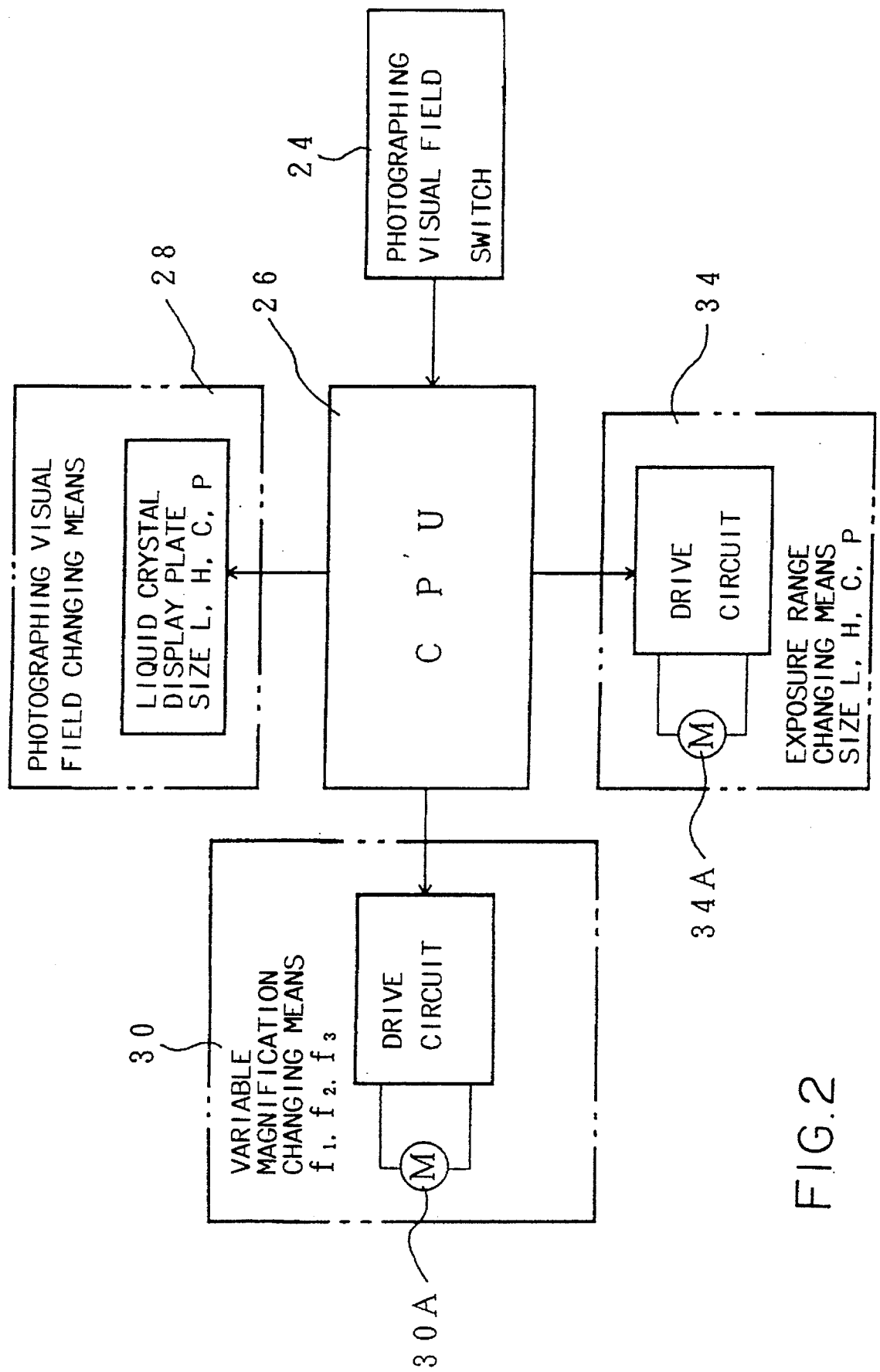
FIG. 2 is a block diagram illustrating one embodiment of a format changing part of a camera according to the present invention.

FIG. 1 is an external view of a camera according to the present invention, and FIG. 2 is a block diagram illustrating one embodiment of a format changing part of the camera in FIG. 1. A camera 10 has a camera body 12, and a taking lens 14 is provided at a central part on a front surface of the camera body 12. A finder 16 is provided above the taking lens 14, and photometric windows 18A and 18B are provided on the left side of the finder 16. A strobe light emitting part 20 is provided on the right side of the finder 16. A shutter release button 22 and a visual field mode changing switch 24, which will be described later, are provided on a top surface of the camera body 12.

The camera 10 is constructed in such a manner that the size of a photographing screen of film can be changed to, for example, a normal size (L-size), a high vision-size (H-size), a cinema scope size (C-size) and a panoramic size (P-size). In this embodiment, an aspect ratio of the L-size is 1.5, that is, the size of the photographing screen is 24 mm×36 mm, and an aspect ration of the H-size is 1.78, that is, the size of the photographing screen is 20.2 mm×36 mm. An aspect ratio of the C-size is 2.30, that is, the size of the photographing screen is 15.7 mm×36 mm, and a aspect ration of the P-size is 2.84, that is, the size of the photographing screen is 12.7 mm×36 mm.

When the visual field mode changing switch 24 is pushed down, it outputs a visual field mode changing signal, and outputs a visual field mode setting signal when returning to its initial position. The visual field mode changing signal and the visual field mode setting signal are respectively input to a CPU 26 of FIG. 2.

Figure 3:
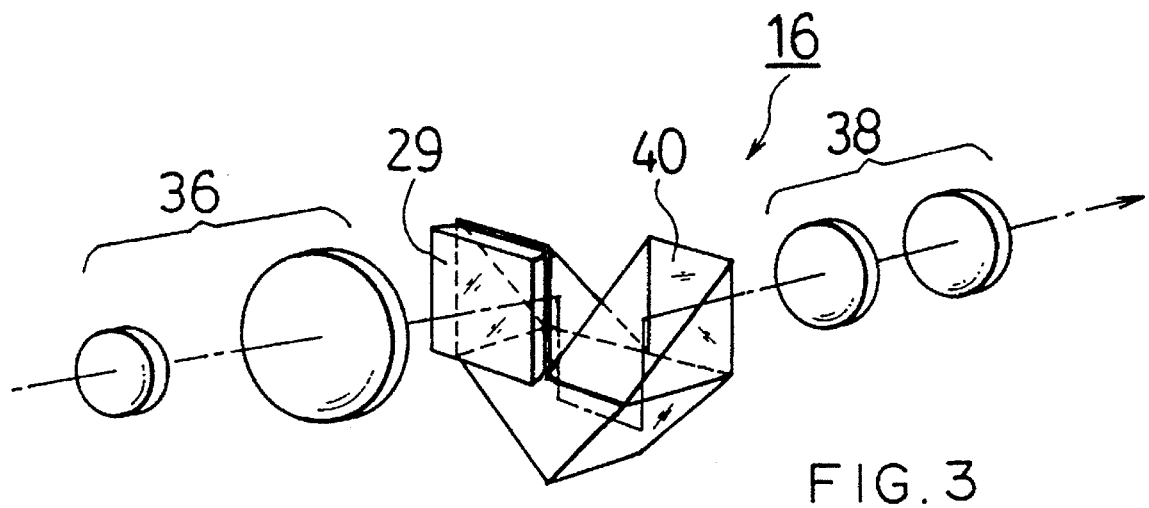
FIG. 3 is a perspective view illustrating a structure of a finder applied to a camera according to the present invention.
Figure 4:
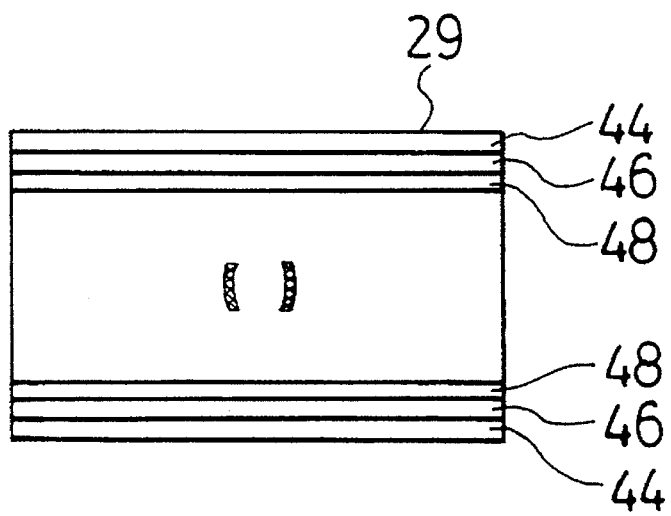
FIG. 4 is a plan view illustration a liquid crystal display provided in a finder of FIG. 3.

The CPU 26 controls a liquid crystal display plate (a photographing visual field changing means) 28 in accordance with the input visual field mode changing signal. FIG. 3 shows a Kepler-type finder 16, and the liquid crystal display plate 29 is provided on an incident surface side of a porro-prism 40 which is located between an objective lens 36 and an eye piece 38 of the finder 16. As shown in FIG. 4, line-shaped liquid crystal display parts 44, 46, and 48 are provided at top and bottom ends of the liquid crystal display plate 28 in such a manner to face each other. Then, when the visual field mode changing signal is input into the liquid crystal display part 44, 46 and 48, the liquid crystal display parts 44, 46 and 48 have a translucent color.

Figure 5:
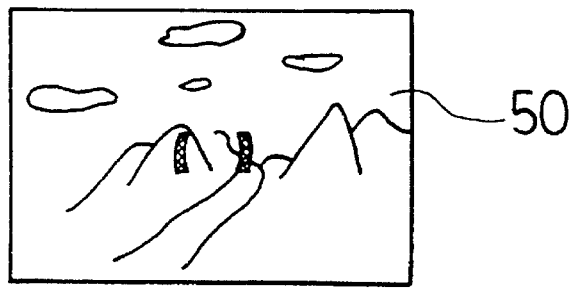
FIG. 5 is a plan view illustrating a photographing visual field within a finder of a normal screen.
Figure 6:
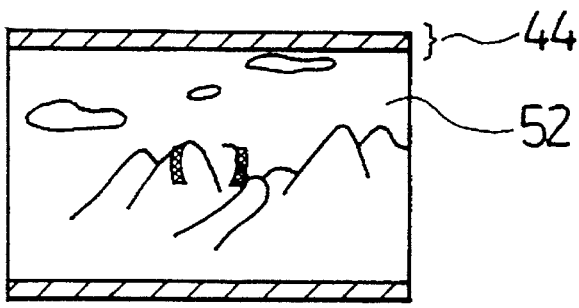
FIG. 6 is a plan view illustrating a photographing visual field within a finder of a high-definition screen.

On the other hand, when the visual mode changing signal is not input to the liquid crystal display parts 44, 46 and 48, the liquid crystal display parts 44, 46, and 48 have no color. When the liquid crystal display parts 44, 46 and 48 do not have color, a photographing visual field 50 of a L-sized finder can be obtained as shown in FIG. 5. Moreover, when the visual field mode changing signal is transmitted to the liquid crystal display part 44, the liquid crystal display part 44 has a translucent color. Therefore, as shown in FIG. 6, a H-sized photographing visual field 52 of the finder can be obtained.

Figure 7:
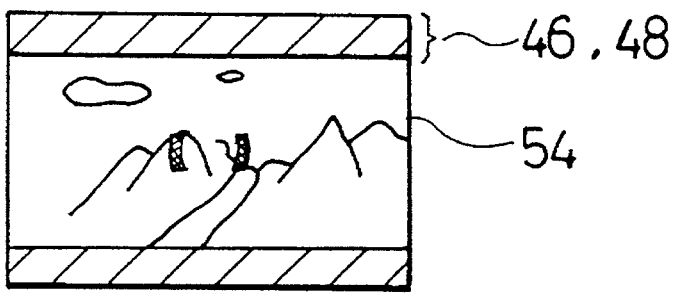
FIG. 7 is a plan view illustrating a photographing visual field within a finder of a cinema scope screen.
Figure 8:
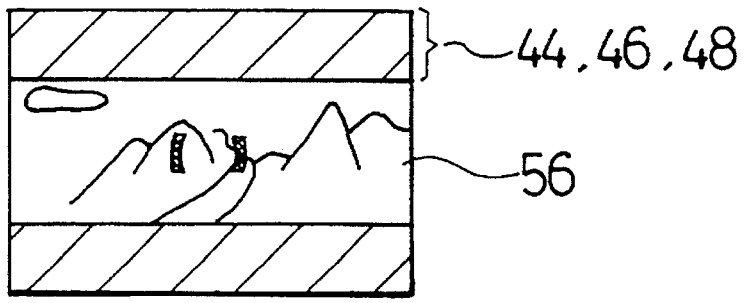
FIG. 8 is a plan view illustrating a photographing visual field within a finder of a panoramic screen.

Furthermore, when the visual field mode changing signal is transmitted to the liquid crystal display parts 44 and 46, the liquid crystal display parts 44 and 46 have a translucent color. As a result, as shown in FIG. 7, a C-sized photographing visual field 54 of the finder is obtained. Then, when the visual field mode changing signal is transmitted to the liquid crystal display parts 44, 46 and 48, the liquid crystal display parts all have a a translucent color, and a P-sized photographing visual field 56 of the finder can be obtained.

Then, the CPU 26 controls the liquid crystal display plate 29 in accordance with the input visual field mode changing signal, the liquid crystal display plate 29 automatically displays four sizes in the finder 16 in the order of L-size→H-size→C-size→P-size at predetermined intervals.

When the visual field mode changing switch 24 returns to its initial position, the visual field mode setting signal is transmitted to the CPU 26. As a result, the CPU 26 outputs the setting signal to an exposure range changing means 34. The exposure range changing means 34 controls a drive motor of the exposure range changing means 34 so as to change over photographing screens of the film between L-size, H-size, C-size and P-size in accordance with the setting signal.

Figure 9:
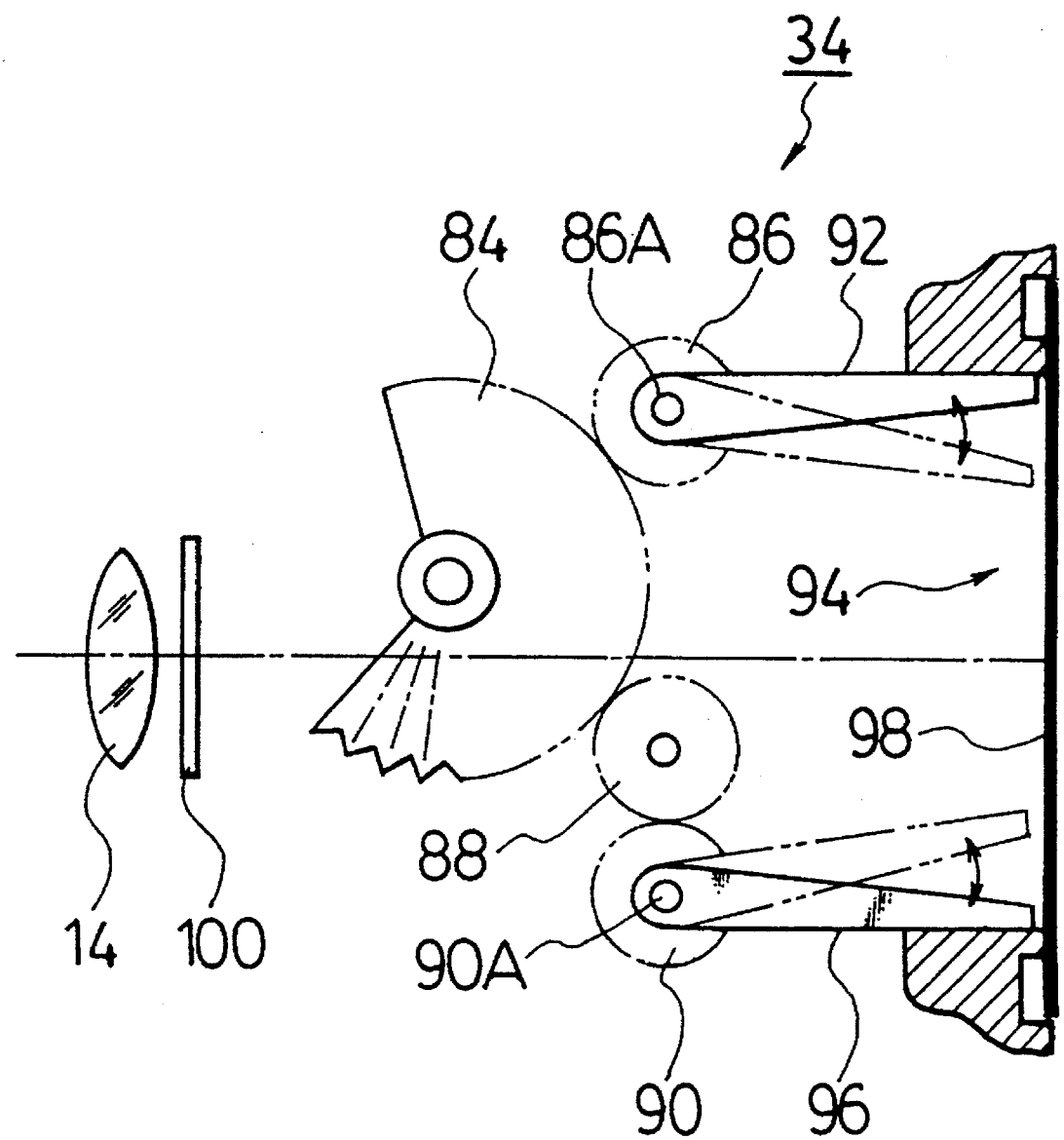
FIG. 9 is an enlarged view illustrating essential portions of an exposure range changing means employed in a camera according to the present invention.

The exposure range changing means 34 has a gear 84 as shown in FIG. 9, and the gear 84 is rotatably supported by the camera body 12. A drive motor, not shown in the drawing, is connected to the gear 84 so as to transmit a rotational force. Gears 86 and 88 mesh with the gear 84, and a gear 90 meshes with the gear 88. An axis 86A is formed to be integrated with the gear 86, and the gear 86 is rotatably supported at the camera body 12 by the axis 86A.

A left end portion of a screen regulating plate 92 is fixed at the axis 86A of the gear 86, and the screen regulating plate 92 forms a top edge of an aperture 94. Likewise, an axis 90A is formed to be integrated with the gear 90, and the gear 90 is rotatably supported at the camera body 12 by the axis 90A. A left end portion of the screen regulating plate 96 is fixed at the axis 90A of the gear 90, and a screen regulating plate 96 forms a bottom edge of an aperture 94. Accordingly, when the drive motor drives and rotates the gear 84, the screen regulating plate 92 and the screen regulating plate 96 move in a direction toward each other or in a direction away from each other.

As a result, an exposure range changing means 82 can change the photographing screen of the film to L-size, H-size, C-size and P-size. Incidentally, in FIG. 9, a number 98 indicates a film strip which is set in the aperture 94, and a number 100 indicates a shutter mechanism provided at the rear of the taking lens 14.

Figure 10:
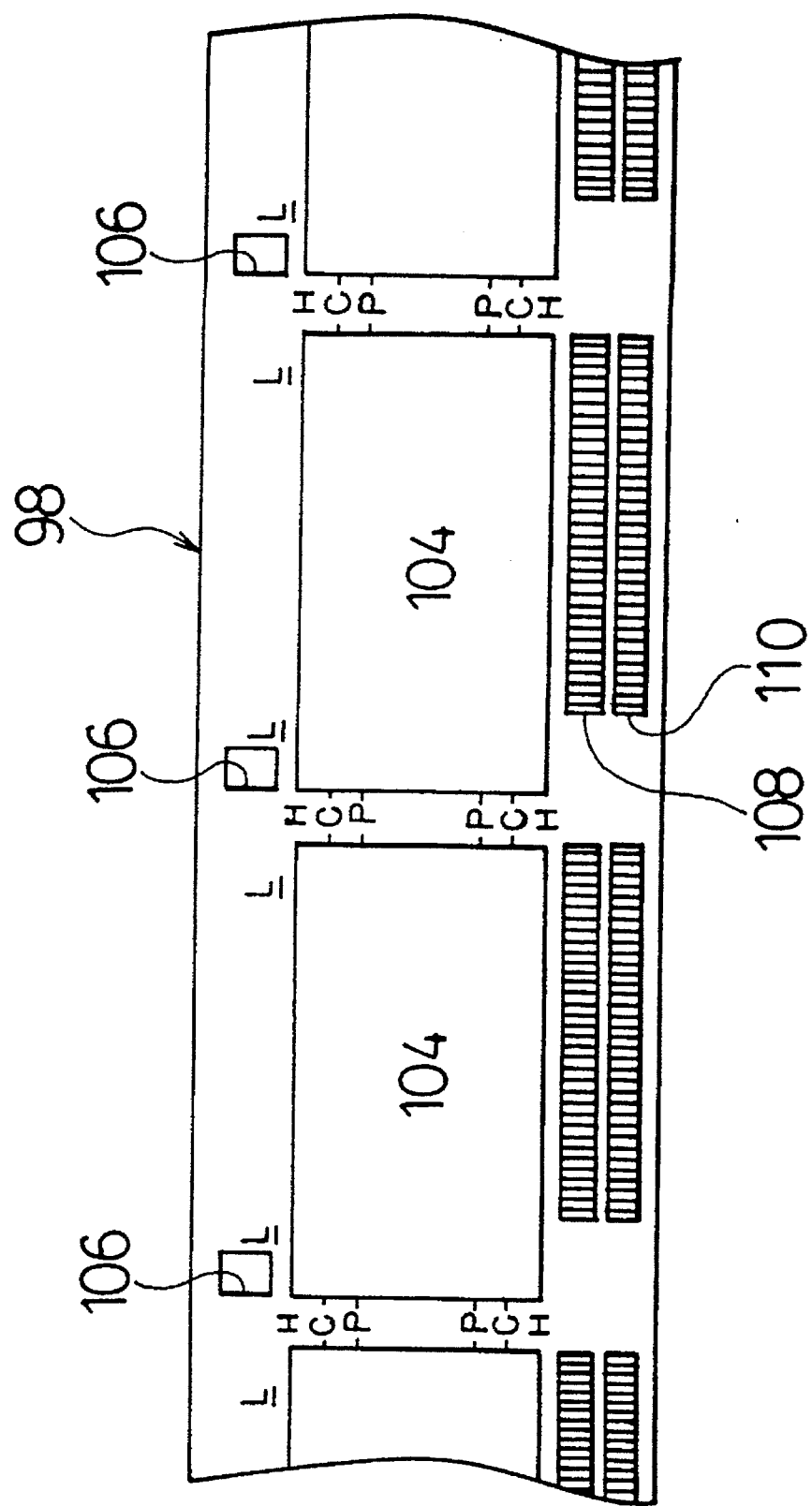
FIG. 10 is a plain view of a film strip employed in a camera according to the present invention.

As shown in FIG. 10, between photographing screens 104 of the film 98, a point H indicating the H-size, a point C indicating the size-C, a point P indicating the P-size, are respectively exposed in advance in order that these points can be viewed by the photographer. Further, above and below the photographing screens 104 a point L indicating a full size of 35 mm and a point indicating the photographing format position are respectively exposed in advance. The positions, at which the points L, H, C and P and the points indicating the photographing format positions are previously exposed, are accurately set in accordance with the positions of perforations 106.

Information recording areas 108 and 110 are provided in upper and lower area below the photographing screens 104.

Information as to a film feed speed is recorded in the upper information recording area 108 by a LED, which emits light at predetermined intervals when the film is fed after photographing, and by a magnetic recording apparatus. At the same time, the information as to the photographing format of the photographing screen 104, etc. are recorded in the lower information recording area 110. When the film 98 is set in a printer, information as to the photographing format, etc., which is recorded in the lower information recording area 110, is read out in accordance with the information as to the speed, which is recorded in the upper information recording area 108. Then, a stretching magnification is automatically set in accordance with the information of the photographing format, etc., and a photographic print is made with an aspect ratio desired by a photographer.

An explanation will hereunder be given of the operation of the camera according to the present invention, which is constructed in the above-mentioned manner. First, the visual field mode changing switch 24 is pushed down, so that the visual field mode changing signal is outputted from the visual field mode changing switch 24. The visual field mode changing signal outputted from the visual field mode changing switch 24 is transmitted the CPU 26. The CPU 26 controls the liquid crystal display plate 29 in accordance with the input visual field mode switching signal. As a result, the photographing visual fields which are controlled by the liquid crystal display plate 28 successively are changed over to L-size→H-size→C-size→P-size→L-size . . . at predetermined intervals as shown in FIGS. 5, 6, 7 and 8.

Then, when a desired mode (for example, the H-size) is selected among the modes of the photographing visual field size, which are sequentially changed over, the visual field mode changing switch 24 is returned to its initial position from the depression position at the mode of H-size. As a result, the visual field mode setting signal is outputted from the visual field mode changing switch 24 to be transmitted to the CPU 26. Therefore, the CPU 26 operates the drive motor of the exposure range changing means 34 of FIG. 2 in accordance with the visual field mode setting signal so as to set the size of the photographing screen of the film at H-size.

In the above-described embodiment, the explanation was given of the case when the drive motor 34A of the exposure range changing means 34 is operated so that the size of the photographing screen of the film is set at H-size after the photographing visual field mode is set. However, the present invention is not limited to this. The drive motor of the exposure range changing means 34 may be operated in accordance with each photographing visual field, which is sequentially changed at predetermined intervals to be displayed within the finder 16.

Moreover, in the above-described embodiment, the explanation was given of the case that the normal size (L-size) is first displayed when the photographing visual field is changed. However, the present invention is not limited to this. For example, the panoramic size (P-size), etc. may be displayed first.

Furthermore, in the above-described embodiment, the photographing visual field is changed in accordance with the aspect ratio, however, the present invention is not limited to this. Only the size of the photographing visual field may be changed while the aspect ratio remains the same.

Moreover, in the above-described embodiment, the exposing condition is mechanically matched with a size of the photographing screen of the film by means of the exposure range changing means 34. However, the present invention is not limited to this. The information as to the photographing visual field mode may be recorded in the lower information area 110. As a result, when the film 98 is set in the printer, the stretching magnification is automatically set in accordance with the information as to the photographing visual field mode (information as to the photographing format), which is recorded in the lower information recording area 110, and the like. And, the photographic print is made with the aspect ratio desired by the photographer. Thus, the information as to the photographing visual field mode is recorded in the lower information recording area 110 at the bottom part of the film 98, so that the exposure range changing means 34 is not required. The information as to the photographing visual field is optically or magnetically recorded in the information recording area 110.

In the above-described embodiment, the explanation was given of the case that the photographing visual field is changed by means of the liquid crystal display plate 29, however, the present invention is not limited to this. The photographing visual field of the finder may be mechanically changed just as in the other embodiment of FIG. 11.

Figure 11:
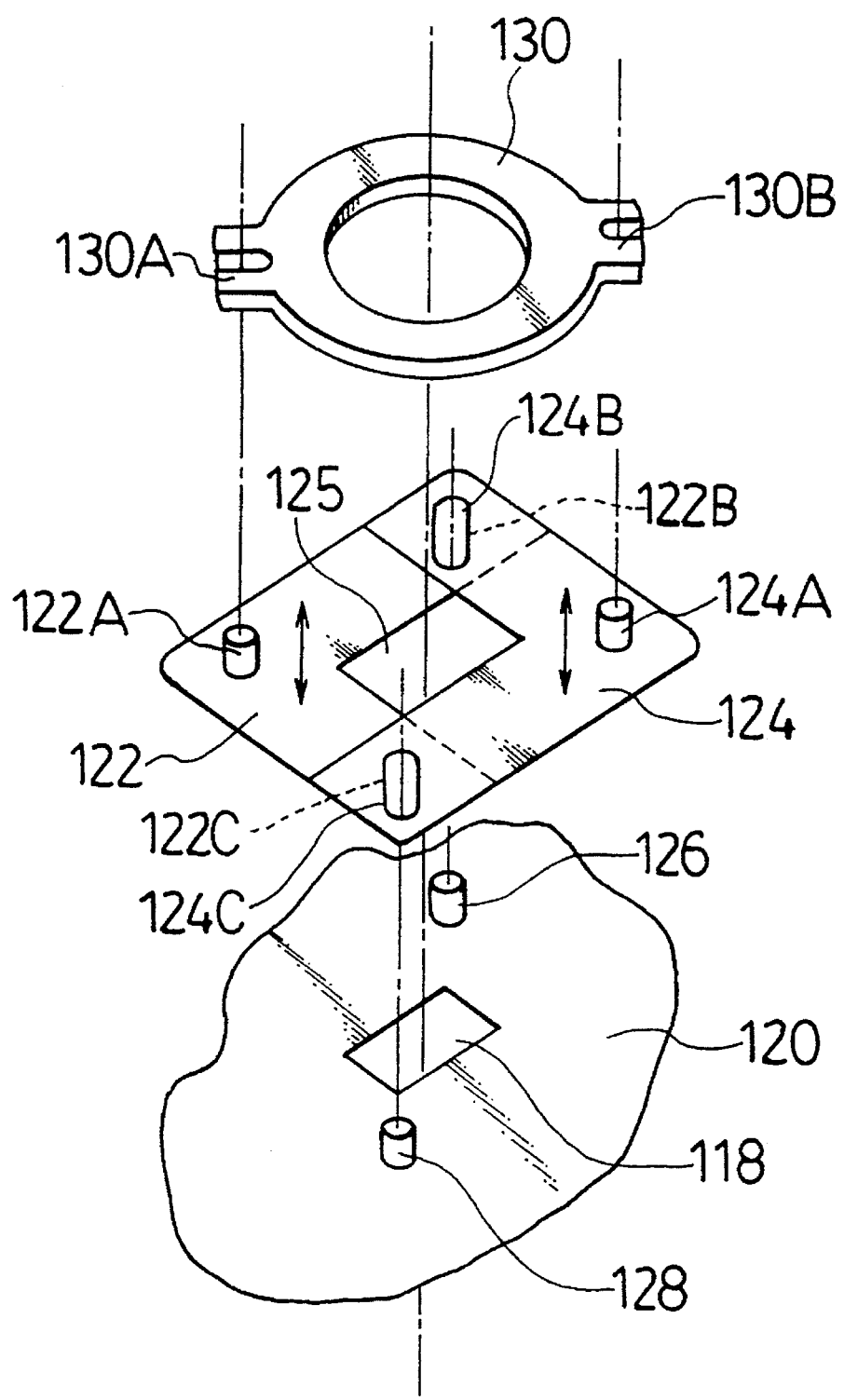
FIG. 11 is an exploded view illustrating a structure of a finder in the other embodiment, which is employed in a camera according to the present invention.

An explanation will hereunder be given of the other embodiment with reference to FIG. 11. A photographing visual field 118 is formed of a normal visual field frame 120, and a visual field changing frame 122 arranged on the normal visual field frame 120. The visual field changing frame 122 is substantially L-shaped, and a dimple 122A is provided at the central part of the visual field changing frame 122. Long holes 122B and 122C are formed at both ends of the visual field changing frame 122.

A visual field changing frame 124 is arranged on the visual field changing frame 122. The visual field changing frame 124 is substantially L-shaped. As a result, a variable photographing visual field 125 is formed by the visual field changing frame 122 and the visual field changing frame 124. A dimple 124A is provided at the central part of the visual field changing frame 124, and long holes 124B and 124C are formed at both ends of the visual field changing frame 124. The long holes 122B and 124B are on the same axis, and similarly, the long holes 122C and 124C are on the same axis. A dimple 126 passes through the long holes 122B and 124B, and the dimple 126 is provided at the normal visual field frame 120.

A dimple 128 passes through the long holes 122C and 124C, and the dimple 128 is provided at the normal visual field frame 120. As a result, the variable photographing visual field 125 overlaps the photographing visual field 118 of the finder. Furthermore, a driving wheel 130 is arranged on the visual field changing frame 122 and the visual field changing frame 124, and long grooves 130A and 130B are formed at the periphery of the driving wheel 130. The dimples 122A and 124A pass through the long grooves 130A and 130B. The driving wheel 130 is rotatably supported around an axis, and a drive motor (not shown in the drawing) is connected to the driving wheel 130 so as to transmit a rotational force.

Accordingly, when the drive motor rotates the driving wheel 130, the dimples 122A and 124A moves in the direction of the arrows. As a result, the size of the variable photographing visual field 125 changes, and the size of the photographing visual field of the finder also changes. Therefore, the CPU 26 controls the drive motor of the driving wheel 130 so that the photographing visual field of the finder can be changed just as in the above-described embodiment.

Furthermore, in the above-described embodiment, the explanation was given of the case that the photographing visual field is displayed on the finder 16 at predetermined intervals in the order of L-size, H-size, C-size, and P-size in accordance with the aspect ratio. However, the present invention is not limited to this. The photographing visual field may be changed in accordance with a changing mode of the focal distance f. In this case, the CPU 26 transmits the visual field mode changing signal to the variable magnification changing means 30 in accordance with the input visual field mode changing signal.

Figure 12:
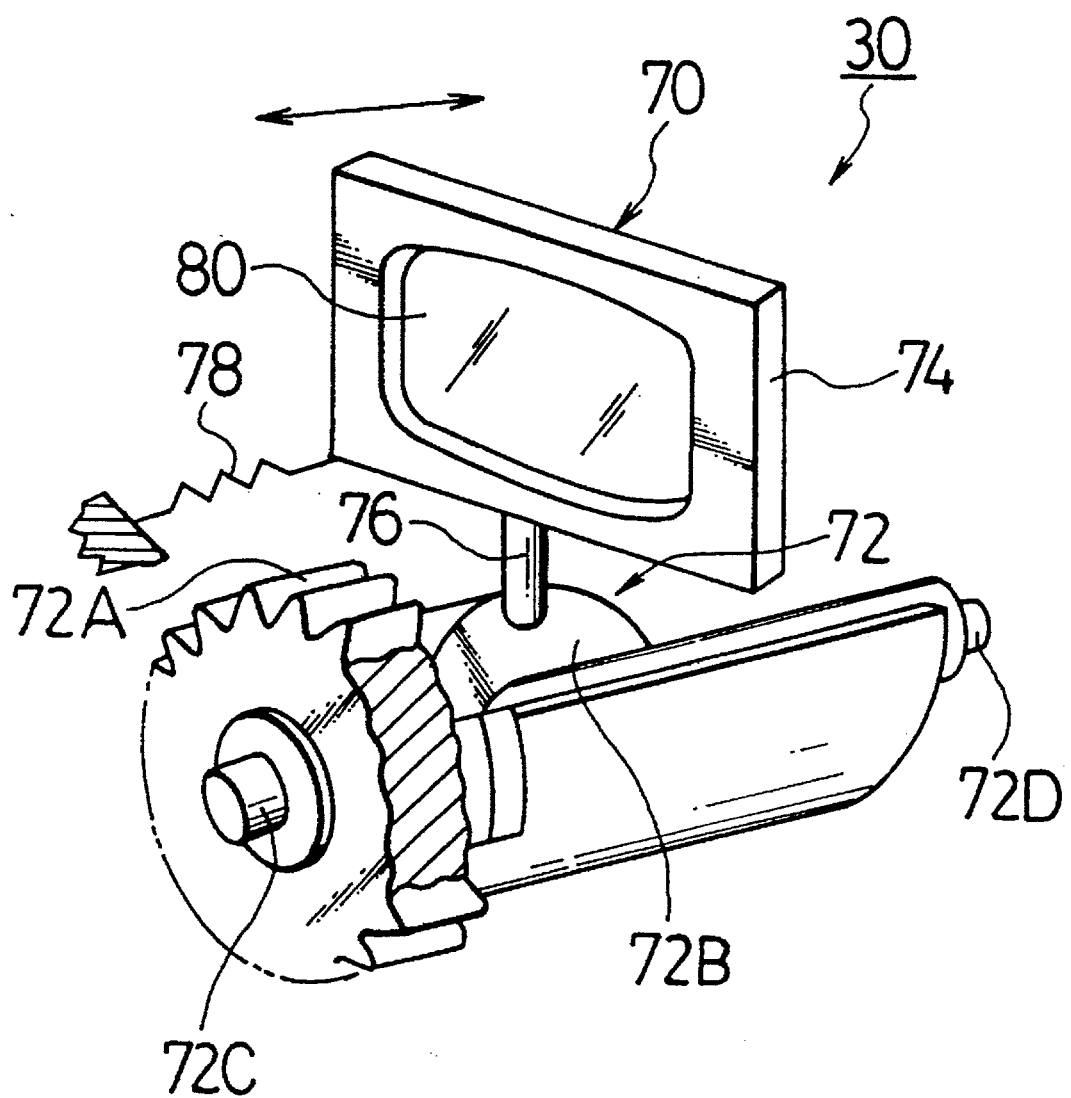
FIG. 12 is an enlarged view illustrating a variable magnification finder employed in a camera according to the present invention.

The variable magnification changing means 30 is provided with a variable magnification finder mechanism 70 as shown in FIG. 12, and a drive cam 72 of a variable magnification finder mechanism 70 is composed of a gear 72A and a solid cam 72B. The drive cam 72 is rotatably supported by a finder part (not shown in the drawing) by pins 72C and 72D formed at both ends of the drive cam 72. The gear 72A is driven to rotate, interlocking with a movable cylinder of a lens mount, which is not shown in the drawing. The movable cylinder is driven by the operation of the drive motor 30A (refer to FIG. 2).

Moreover, a spring 78 is attached at a movable lens frame 74, and a forward end portion of a pin 76 projecting from the movable lens frame 74 contacts the solid cam 72B due to the force of the spring 78. Therefore, when the gear 72A rotates, the movable lens frame 74 moves forward and backward. As a result, a movable lens 80 provided within the movable lens frame 74 moves in the direction of an arrow (forward and backward directions of the camera), and the magnification of the photographing visual field of the finder is adjusted in accordance with the magnification at the time of photographing.

Figure 13:
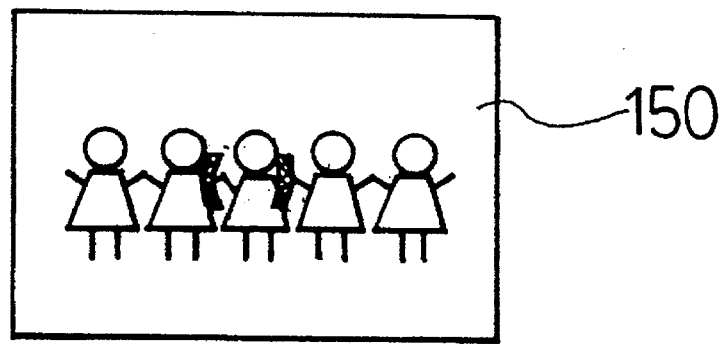
FIG. 13 is a plan view illustrating a photographing visual field of a focal distance $f_1$.
Figure 14:
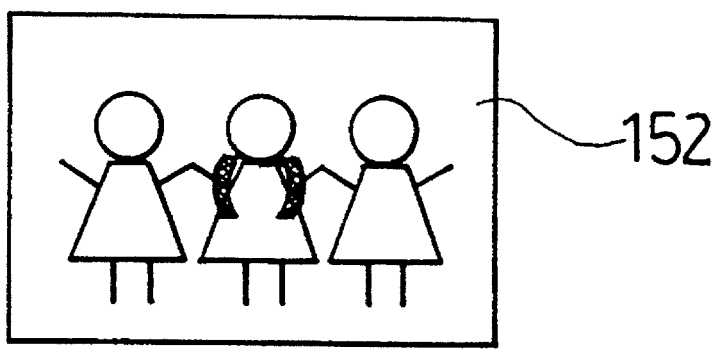
FIG. 14 is a plan view illustrating a photographing visual field of a focal distance $f_2$.
Figure 15:
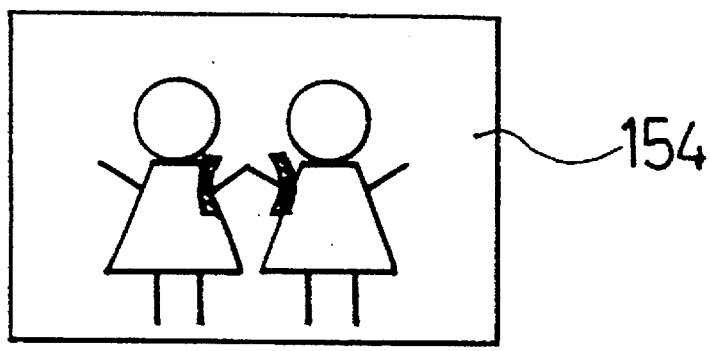
FIG. 15 is a plan view illustrating a photographing visual field of a focal distance $f_3$.

Then, when the focal distance f of the camera 10 as shown in FIG. 1 is between 35 mm and 70 mm, for example, an automatic mode changing of the focal distance is set in three steps, that is, $f_1=35$ mm, $f_2=50$ mm, $f_3=70$ mm. In this case, the variable magnification changing means 30 operates the drive motor 30A which drives the movable cylinder of the lens mount in accordance with the visual field mode changing signal transmitted from the CPU 26, and changes a focal distance mode of the photographing visual field at predetermined intervals in the order of $f_1=35$ mm (refer to a photographing visual field 150 of FIG. 13), $f_2=50$ mm (refer to the photographing visual field 152 of FIG. 14) and $f_3=70$ mm (refer to the photographing visual field 154 of FIG. 15).

Next, an explanation will hereunder be given of an operation of the camera according to the present invention, which is constructed in the above-mentioned manner. First, the visual field mode changing switch 24 is pushed down, so that a visual field mode changing signal is outputted from the visual field mode changing switch 24. Then, the visual field mode changing signal outputted from the visual field mode changing switch 24 is transmitted to the CPU 26. The CPU 26 outputs the visual field mode changing signal to the variable magnification changing means 30 in accordance with the visual field mode changing signal.

The variable magnification changing means 30 operates a drive motor which drives a movable cylinder of a lens mount so as to change the mode of the focal distance f in the order of $f_1=35$ mm, $f_2=50$ mm and $f_3=70$ mm. In the case that a desired mode (for example, the mode of $f_2=50$ mm) is selected among the modes of the focal distance f, which are sequentially changed, the visual field mode changing switch 24 is returned to its initial position from the depression position when the mode of $f_2=50$ mm is displayed in the finder 16. As a result, the visual field mode setting signal is transmitted from the visual field mode changing switch 24 to the CPU 26.

The CPU 26 outputs a setting signal to the variable magnification changing means 30 in accordance with the visual field mode setting signal. The variable magnification changing means 30 stops the rotation of the drive motor 30A in accordance with the setting signal. As a result, the focal distance f of a zoom lens is set at $f_2=50$ mm. Incidentally, the focal distance $f_2=50$ mm can be set exactly in a normal zooming operation.

In the above-described embodiment, the explanation was given of the case that the changeover operation of the photographing visual field corresponding to aspect ratios and the changeover operation of the photographing visual field corresponding to the focal distance f are separately carried out. However, the present invention is not limited to this. These two operations can be carried out in combination. In this case, the CPU 26 controls the liquid crystal display plate 28, prioritizing it over the variable magnification changing means 30.

That is, the CPU 26 sets a size of the photographing screen of the film at L-size by means of the liquid crystal display plate 29. Then, the focal distance f is changed to $f_1=35$ mm to $f_2=50$ mm to $f_3=70$ mm at predetermined intervals. Next, the size of the photographing screen of the film is changed from L-size to H-size with the liquid crystal display plate 29. Then, the focal distance f is changed to $f_1=35$ mm to $f_2=50$ mm to $f_3=70$ mm at predetermined intervals by means of the variable magnification changing means 30 in such a state that the photographing screen is a H-size.

Next, the size of the photographing screen of the film is changed from H-size to C-size by means of the liquid crystal display plate 28. Then, the focal distance f is changed to $f_1=35$ mm to $f_2=50$ mm to $f_3=70$ mm at predetermined intervals by the variable magnification changing means 30 in such a state that the photographing screen is C-size. Next, the size of the photographing screen of the film is changed from C-size to P-size by means of the liquid crystal display plate 29. Then, the focal distance f is changed to $f_1=35$ mm to $f_2=50$ mm to $f_3=70$ by the variable magnification changing means 30 at predetermined intervals in such a state that the photographing screen is P-size.

On the other hand, when the photographing is carried out in a desired mode (for example, a mode of $f_2=50$ mm and H-size) which is selected among modes of photographing screen sizes and focal distances f, which are sequentially changed, as described above, and the mode of $f_2=50$ mm and H-size is displayed in the finder 16, the visual field mode changing switch 24 is full depressed. As a result, the visual field mode setting signal is outputted from the visual mode changing switch 24 and is transmitted to the CPU 26.

The CPU 26 outputs the setting signal to the variable magnification changing means 30 in accordance with the visual field mode setting signal. The variable magnification changing means 30 stops the rotation of the drive motor 30A in accordance with the setting signal. As a result, the focal distance f of the zoom lens is set at $f_2=50$ mm. The CPU 26 operates the drive motor of an apparatus 82 for changing the size of the photographing screen of the film, which will be described later, and sets the size of the photographing screen of the film at H-size.

In the above-described embodiment, the explanation was given of the case when the photographing visual field is determined by returning the visual field mode changing switch 24 to the initial position from the depression position. However, the present invention is not limited to this. The shutter release button may be half-pressed so that the photographing visual field can be determined.

In the above-described embodiment, the explanation was given of the case when the photographing visual field mode is changed in such a manner that the aspect ratio is prioritized over the focal distance f of the zoom lens. However, the present invention is not limited to this. The focal distance f of the zoom lens may be prioritized over the aspect ratio so that the photographing visual field mode can be changed.

Moreover, in the above-described embodiment, the explanation was given of the case when the zoom lens for photographing is used. However, the present invention is not limited to this. The zooming information of the set photographing visual field mode may be recorded in an information recording area 110 at the bottom of the film 98. As a result, the film 98 is set in a printer, a photographic print is made in accordance with the zooming information which is recorded in the information recording area 110 at the bottom of the film. Thus, the zoom information of the photographing visual field mode is recorded in the information recording area 110 at the bottom of the film 98, so that the zoom lens for photographing can be removed.

As has been described above, an optimum photographing visual field corresponding to a subject can be easily set, so a desired subject can be photographed in an optimum condition. Furthermore, a plurality of photographing visual fields can be automatically monitored for comparison so that the photographing visual field can be easily selected.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera, comprising:

a finder capable of displaying a plurality of photographing visual fields;

a switch for changing said photographing visual fields;

photographing visual field changing means for sequentially selecting each one of said plurality of photographing visual fields at a predetermined interval to display sequentially each one of said photographing visual fields within said finder when said switch is turned on and for stopping a sequential changing of said photographing visual fields when said switch is turned off.

2. The camera according to claim 1, wherein:

said finder displays said plurality of photographing visual fields by changing visual field frames.

3. The camera according to claim 1, wherein:

said plurality of photographing visual fields are a plurality of visual field frames having different aspect ratios.

4. The camera according to claim 1, wherein:

said plurality of photographing visual fields are a plurality of visual field frames which have a same aspect ratio and different sizes.

5. The camera according to claim 1, wherein:

said finder has a variable magnification optical system, and displays said plurality of photographing visual fields by changing a focal distance of the variable magnification optical system.

6. The camera according to claim 2, wherein:

said finder has a variable magnification optical system, and displays said plurality of photographing visual fields by changing a focal distance of the variable magnification optical system.

7. The camera according to claim 3, further comprising:

means for recording information indicating an aspect ratio corresponding to a desired photographing visual field which is selected among said plurality of photographing visual fields on a film.

8. The camera according to claim 3, further comprising:

exposure range changing means for exposing a film in an exposure range having an aspect ratio corresponding to a desired photographing visual field which is selected among said plurality of photographing visual fields.

9. The camera according to claim 5, further comprising:

zooming information recording means for recording zooming information of a taking lens on a film in order to obtain a photographic screen corresponding to a desired photographing visual field which is selected among said plurality of photographing visual fields.

10. The camera according to claim 5, further comprising:

zoom switching a means for switching zoom state of a taking lens in order to obtain a photographing screen corresponding to a desired photographing visual field which is selected among said plurality of photographing visual fields.

11. The camera according to claim 1, wherein:

said plurality of photographing visual fields are respectively displayed as visual field frames which have different aspect ratios and different focal distances of a variable magnification optical system of said finder;

said camera further comprising means for recording information as to an aspect ratio corresponding to a desired photographing visual field which is selected among said plurality of photographing visual fields and information as to zoom of said focal distances on a film strip.

12. The camera according to claim 1, wherein:

said plurality of photographing visual fields are respectively displayed as visual field frames which have different aspect ratios and different focal distances of a variable magnification optical system of said finder;

said camera further comprising exposure range changing means for exposing on a film strip in an exposure range indicating an aspect ratio corresponding to a desired photographing visual field selected among said plurality of photographing visual fields and zoom changing means for changing a zoom state of a taking lens in order to obtain a photographing screen corresponding to the desired photographing visual field which is selected among said plurality of photographing visual fields.

* * * * *